(12) United States Patent
Margalit et al.

(10) Patent No.: US 9,866,560 B2
(45) Date of Patent: Jan. 9, 2018

(54) SECURE DATA ACCESS

(71) Applicant: Empire Technology Development LLC, Alexandria, VA (US)

(72) Inventors: Mordehai Margalit, Zichron Yaaqov (IL); Vered Zilberberg, Ein Sarid (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/007,560

(22) PCT Filed: Dec. 20, 2012

(86) PCT No.: PCT/US2012/070835
§ 371 (c)(1),
(2) Date: Sep. 25, 2013

(87) PCT Pub. No.: WO2014/098856
PCT Pub. Date: Jun. 26, 2014

(65) Prior Publication Data
US 2014/0223574 A1     Aug. 7, 2014

(51) Int. Cl.
*H04L 29/06* (2006.01)
*H04L 29/08* (2006.01)

(52) U.S. Cl.
CPC ............ *H04L 63/10* (2013.01); *H04L 63/102* (2013.01); *H04L 67/1097* (2013.01)

(58) Field of Classification Search
CPC . H04L 63/1416; H04L 63/1408; H04L 63/10; H04L 63/102; H04L 67/1097; G06F 21/10; G11B 20/00086

USPC .......................................................... 726/27
See application file for complete search history.

(56) References Cited

U.S. PATENT DOCUMENTS

| | | | | |
|---|---|---|---|---|
| 7,644,434 | B2* | 1/2010 | Pollutro | G06F 21/31 726/12 |
| 7,925,759 | B2* | 4/2011 | Slik | G06F 19/322 709/217 |
| 8,788,427 | B2* | 7/2014 | Johnson | G06Q 20/385 705/53 |
| 2008/0208867 | A1 | 8/2008 | Poston et al. | |

(Continued)

FOREIGN PATENT DOCUMENTS

WO     2012167094 A1     12/2012

OTHER PUBLICATIONS

International Search Report from corresponding International Application No. PCT/US12/070835 dated May 9, 2013.

(Continued)

*Primary Examiner* — Matthew Smithers
(74) *Attorney, Agent, or Firm* — Brundidge & Stranger, P.C.

(57) ABSTRACT

Technologies are generally disclosed for methods and systems for providing secure document storage and retrieval services. In an example embodiment, a method includes receiving an exclusive address at which to send secure links, receiving a request to store a document, storing the document with a remote storage service, receiving location information from the remote storage service, transmitting the location information at which the document is stored to the exclusive address, and updating the location information dynamically.

23 Claims, 4 Drawing Sheets

(56) References Cited

U.S. PATENT DOCUMENTS

| | | | | |
|---|---|---|---|---|
| 2009/0228716 | A1* | 9/2009 | Poston | G06F 21/6209 |
| | | | | 713/189 |
| 2011/0264906 | A1 | 10/2011 | Pourzandi et al. | |
| 2012/0167094 | A1 | 6/2012 | Suit | |
| 2012/0167180 | A1* | 6/2012 | Lee | G06F 21/31 |
| | | | | 726/4 |
| 2012/0291133 | A1* | 11/2012 | Nagpal | G06F 21/6218 |
| | | | | 726/26 |
| 2013/0074158 | A1* | 3/2013 | Koskimies | H04L 63/0428 |
| | | | | 726/4 |
| 2014/0096199 | A1* | 4/2014 | Dave | G06F 21/604 |
| | | | | 726/4 |

OTHER PUBLICATIONS http://www.wwpass.com/solutions/personal/, 2013.
http://www.exelegalservices.com/services/digital-documentation/personal-cloud-storage/, 2 pages, 2013.
Method of Generating Weblinks to Stored Information, 2013.
"PhoneFactor's Out-of-Band Authentication Platform Offers Stronger Security", 2 pages 2012.
VaultWorthy—Preserve and Protect Your Critical Documents, https://www.vaultworthy.com/features, 2 pgs. 2012.
"Personal Cloud Storage," accessed at http://www.exelegalservices.com/services/digital-documentation/personal-cloud-storeage/, accessed on Jan. 30, 2015, pp. 2.
"Personal Solutions," accessed at https://web.archive.org/web/20121104115924/http://www.wwpass.com/solutions/personal/, pp. 3, Nov. 4, 2012.
"The features that make Nomadesk secure and simple" accessed at https://web.archive.org/web/20121004023925/https://www.nomadesk.com/features, pp. 4, Oct. 4, 2012.

* cited by examiner

SECURE DATA ACCESS

CROSS-REFERENCE TO RELATED APPLICATION

This Application is the U.S. National Stage filing under 35 U.S.C. §371 of PCT Application Ser. No. PCT/US2012/070835 filed on Dec. 20, 2012. The disclosure of the PCT Application is hereby incorporated herein by reference in its entirety.

BACKGROUND

The proliferation of electronic devices, such as, for example, smartphones, tablets, personal computers, etc., has allowed users to complete a wide range of tasks, thereby leading to virtually daily dependence upon the electronic devices. This widespread use inherently requires the storage of significant amounts of data for many users, which, due to hardware limitations and the mobility of the electronic devices, is commonly stored on a remote server, such as a cloud storage device. The security of the data stored in cloud-based locations is frequently the target of criticism because of inadequate methods used to protect data from unauthorized access.

SUMMARY

In one embodiment, a computer-readable medium may be configured to store one or more executable instructions that, when executed, cause one or more processors to receive registration information for a secure data service; receive a request for data; transmit a pointer, having at least one restrictive property for the data; and disable the pointer.

In another embodiment, a method includes receiving registration information; receiving a request to securely store a document; storing the document at a first storage location; transmitting, to an address included in the registration information, a secure link corresponding to the first storage location; and disabling the secure link in accordance with at least one predetermined condition.

In still another embodiment, a method includes receiving an exclusive subscriber address, receiving a request to store a document, storing the document with a remote storage service, receiving location information from the remote storage service, transmitting the location information at which the document is stored to the exclusive subscriber address, and invalidating the location information upon fulfillment of a predetermined condition.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly included herein.

This disclosure is not limited to the particular systems, devices, methods, and computer program products described herein, as these may vary. The terminology used in the description is for the purpose of describing the particular versions or embodiments only, and is not intended to limit the scope.

Figure 1:
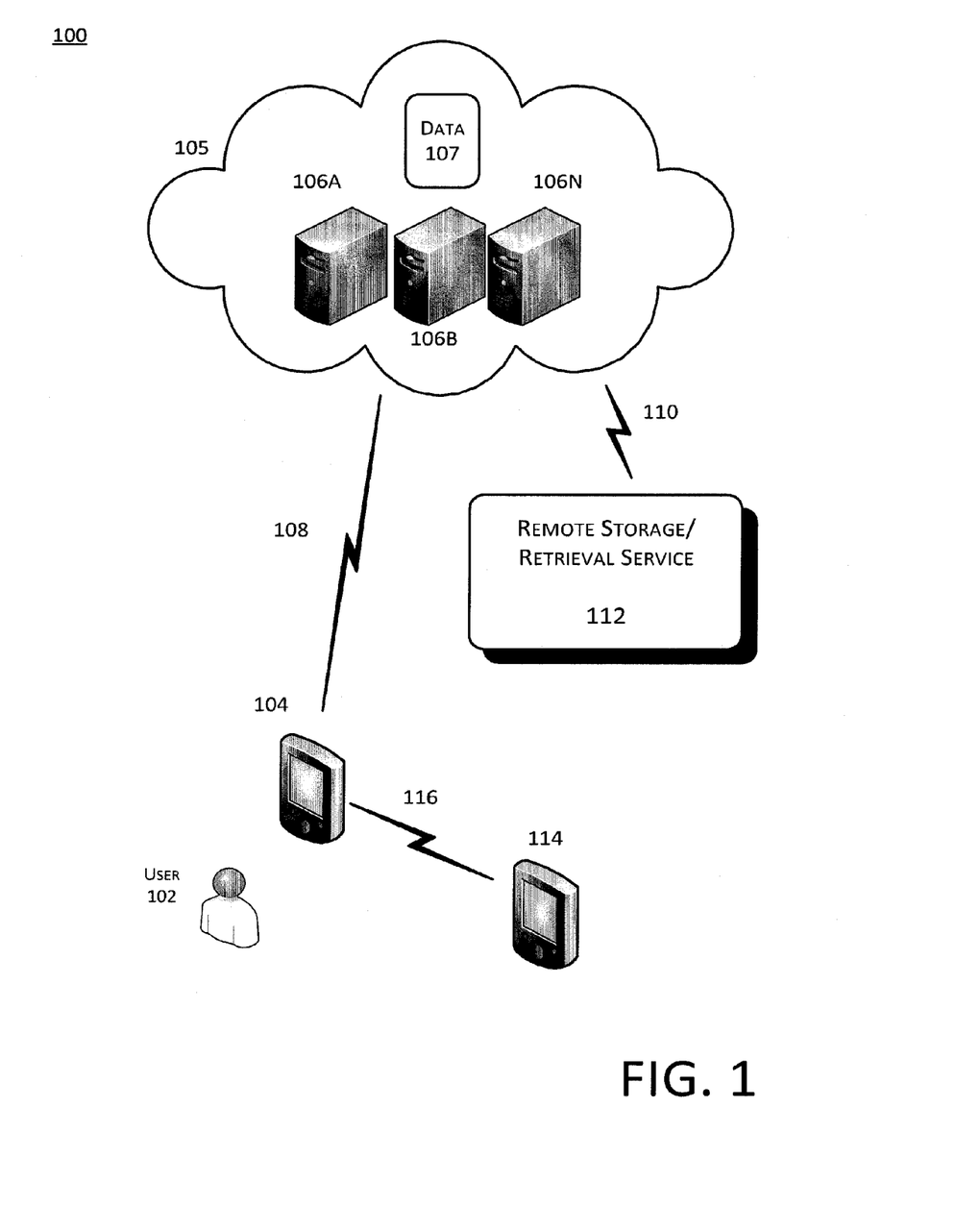
FIG. 1 shows an example system configuration in which secure data access may be implemented, arranged in accordance with at least some embodiments described herein.

FIG. 1 shows an example system configuration 100 in which secure data access may be implemented, arranged in accordance with at least some embodiments described herein. As depicted, configuration 100 includes a client device 104; a data storage/retrieval service 105 at which any of servers 106A, 106B, . . . , 106N may securely store data 107; a remote storage/retrieval service 112; and another client device 114.

A user 102 may be regarded as a person or entity that exercises ownership and/or control over client device 104; and another such user may exercise similar ownership and/or control over the other client device 114. In the examples described herein, user 102 may be a person who desires to securely store and retrieve one or more digital files utilizing services offered by service provider 105.

As described herein, references to a "cloud" may refer to wide area networks (WAN), e.g., the Internet, or a local area network (LAN) within an organization.

As further described herein, non-limiting examples of a "digital file" may refer to any document, e.g., passport, driver's license, contract, will, purchase agreement, medical record, laboratory notebook, etc. Digital files, as described herein, may be alternatively referred to as "data," e.g., within the context of "data storage" and/or "data retrieval."

Client device 104 may be implemented as a mobile (or portable) electronic device such as a mobile phone, cell phone, smartphone, personal data assistant (PDA), a personal media player device, an application specific device, or a hybrid device that includes any of the above functions. Client device 104 may also be implemented as a personal computer including tablet, laptop computer, and non-laptop computer configurations, which may be connected to a wireless, wired, or mobile communications network.

A wireless service provider for implementing communications for client device 104 may alternatively be referred to as a mobile network carrier, wireless carrier, or even cellular company. Regardless of the alternate reference, the wireless service provider may provide network communication services for mobile communications subscribers. Non-limiting examples of such network communication services may include telephone communication services and internet connectivity services. Client device 104 may be configured to communicate with service provider 105 and/or another client device 114, utilizing a communication infrastructure provided by the wireless service provider.

Service provider 105 may refer to a cloud-based, secure data storage and/or retrieval platform. Service provider 105 may be a proprietary service within, e.g., a corporate entity. That is, the infrastructure that includes cloud-based service provider 105 may be operated for a single organization, and may be managed internally by the single organization and hosted internally or externally. Alternatively, service provider 105 may be owned and/or operated by a third-party service provider. Non-limiting examples of such organizations that operate, manage, and/or host such an infrastructure may include, but not be limited to, Amazon®, Microsoft®, Google®, Apple®, IBM®, etc.

Regardless of ownership and/or control, service provider 105 may include a platform framework of hardware, software, firmware, or any combination thereof, on which an application, or some computer program product, may be hosted and/or executed for one or more digital files that are received from client device 104. More particularly, service provider 105 may be implemented as a cloud-based file storage and retrieval service to which at least user 102 of client device 104 may register prior to use. Further, service provider 105 may partner with remote storage/retrieval service 112 to store one or more digital files for user 102 who has subscribed to storage/retrieval services offered by service provider 105.

Service provider 105 may include an infrastructure having multiple servers, 106A, 106B, . . . , 106N that include, e.g., computer hardware and computer software, configured to store data 107, and that are configured to provide additional secure cloud-based storage and retrieval services. Unless a distinction is necessary for the purposes of the present description, servers 106A, 106B, . . . , 106N may be referred to, collectively, hereafter as "servers 106."

The infrastructure for a cloud-based storage and retrieval service provider for implementing secure data access is in no way limited to the embodiments depicted as part of configuration 100. Quantities of, e.g., servers 106 hosted thereon or otherwise associated therewith, as well as a locality for data 107 or virtualizations thereof, may vary from one embodiment to another, without departing from the spirit or scope of secure data access, as described herein.

Remote storage/retrieval service 112 may also refer to a cloud-based, secure data storage and/or retrieval platform owned and/or operated by a third-party service provider, which may be separate or independent of service provider 105. In the context of at least one example embodiment of secure data access, remote storage/retrieval service 112 may include a separate service provider with which service provider 105 partners to store digital files for one or more subscribers to service provider 105.

A communication link 108 may refer to a communication link that is enabled by a protocol utilized to transmit, at least, subscription information and digital files between client device 104 and service provider 105.

A communication link 110 may refer to a communication link that is enabled by a protocol utilized to transmit, at least, digital files between service provider 105 and remote storage/retrieval service 112.

A communication link 116 may refer to a communication link that is enabled by a protocol utilized to transmit, at least, location information for at least one digital file between client device 104 and client device 114.

The aforementioned protocols referring to communication links 108, 110, and 116, may include any mobile communications technology, e.g., GSM (Global System for Mobile Communications), CDMA (Code Division Multiple Access), etc., depending upon the technologies supported by particular wireless service providers to whose services client device 104, service provider 105, remote storage/retrieval service 112, and client device 114 may respectively be assigned or subscribed. Further, one or more of the aforementioned communication links 108, 110, and 116 may be implemented utilizing non-cellular technologies such as Wi-Fi™, wireless local area network (WLAN or IEEE (Institute of Electrical and Electronics Engineers) 802.11), WiMAX™ (Worldwide Interoperability for Microwave Access), Bluetooth™, hard-wired connections, e.g., cable, phone lines, and other analog and digital wireless voice and data transmission technologies.

Thus, FIG. 1 shows an example implementation of a system configuration 100 for implementing secure data access.

Figure 2:
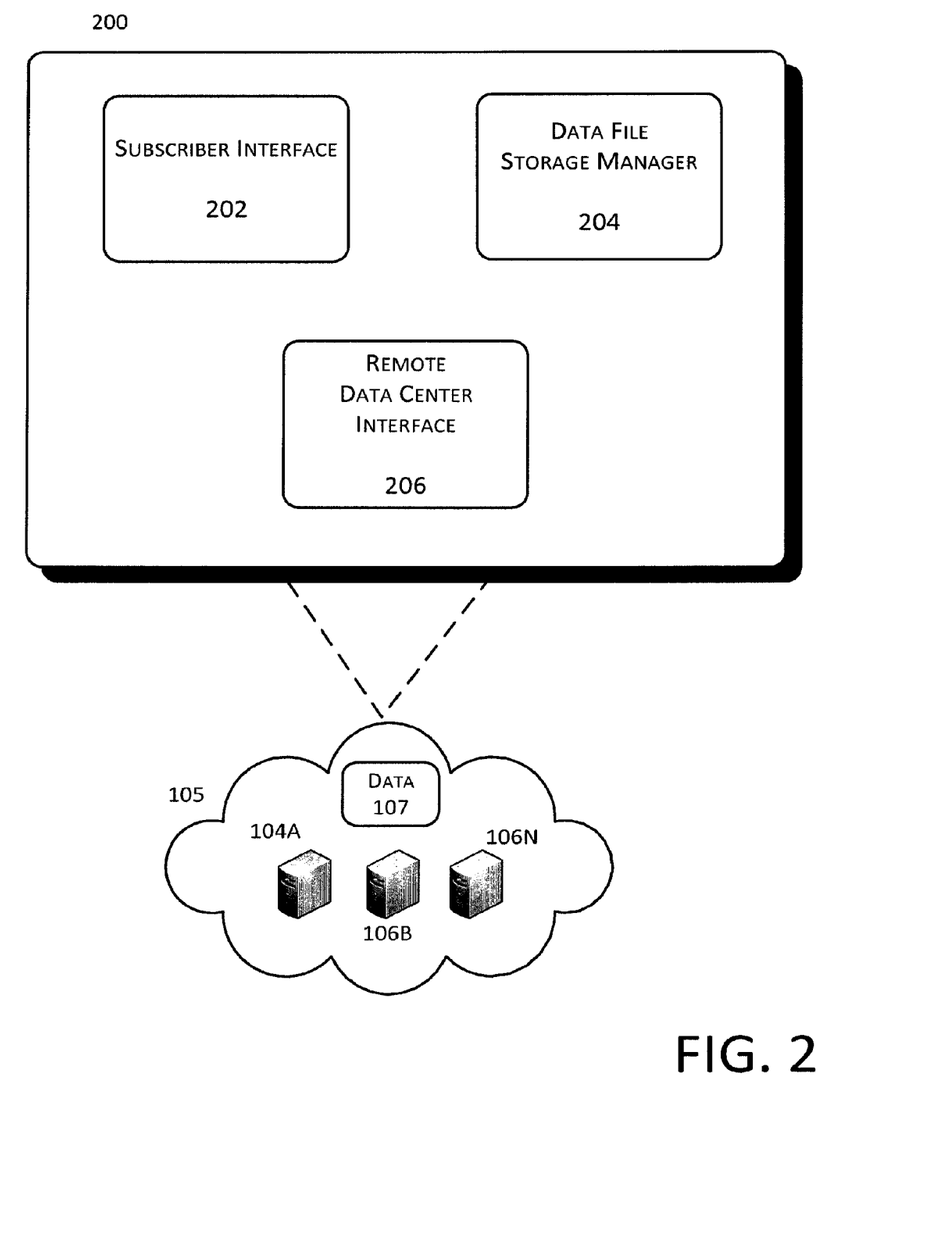
FIG. 2 shows an example configuration of an application for implementing secure data access, arranged in accordance with at least some embodiments described herein.

FIG. 2 shows an example configuration of an application 200 for implementing secure data access, arranged in accordance with at least some embodiments described herein. Application 200 may refer to a program implemented by hardware, software, firmware, or any combination thereof. In some embodiments, application 200 may be hosted on one or more of servers 106 associated with service provider 105. Further, application 200 may include various components or modules, e.g., implemented by one or more computer-readable media including but not limited to Application Specific Integrated Circuit (ASIC) or Customer Specific Integrated Circuit (CSIC). The various components or modules corresponding to application 200 may include, but are not limited to, a subscriber interface 202, a data file storage manager 204, and a third-party interface 206. Further, application 200 is not limited to such components or modules, as obvious modifications may be made by adding further components or modules or even eliminating at least one of the components or modules described here or even by having various components or modules assuming roles accorded to other components or modules in the following description.

Subscriber interface 202 may refer to a component or module that may be designed, programmed, and/or configured to interface with, at least, client device 104 and/or any device corresponding to an address provided by user 102, e.g., during a subscription process with service provider 105. In accordance with at least one example embodiment, subscriber interface 202 may enable client device 104, under the ownership and/or control of user 102, to subscribe to the secure cloud-based storage and retrieval services offered by service provider 105. Service provider 105 may offer, and user 102 of client device 104 may subscribe to, secure cloud-based storage and retrieval services by which a locator for a stored digital file may be transmitted exclusively to the address specified by user 102 as part of the registration or subscription process with service provider 105. Further to the at least one example embodiment, such an address may include one of a telephone number, an email address, an IP address, or a media access control (MAC) address. Thus, the locator may be transmitted to a device corresponding to the given address in the form of an SMS text message, an instant message, a voice mail, an email, or any other suitable communication using the given address. The locator itself, which may alternatively be referred to as a pointer, may be provided in the form of a proprietary code or a Uniform Resource Locator (URL). Thus, because various example embodiments contemplate the locator being exclusive to a device corresponding to a registered address or being valid for one-time use, the locator may be considered to have one or more restrictive properties which, themselves, may vary from one embodiment to another. Examples of such restrictive properties include, but are not limited to, one-time use, one-time use by a device at a corresponding address, one-time use after transfer, one-time use upon entry of a password, one-time use upon biometric authorization, etc. Such examples of the locators and forms by which they may be transmitted, and restrictions thereon, are not intended to be limiting.

Subscriber interface 202, in accordance with at least one further example, may enable a locator or pointer to a storage location of data 107, which may be stored by service provider 105, to be transmitted to an address for the other client device 114. In such an example embodiment, the address for the other client device 114 may be submitted to service provider 105 by client device 104, under ownership and/or control of user 102, during the registration or subscription process with service provider 105. Thus, the exclusive or restricted locator or pointer to the storage location of data 107 may be transmitted to the other client device 114 via client device 104; alternatively the locator or pointer may be transmitted directly to the other client device 114 from service provider 105 upon authorization by client device 104, under ownership and/or control of user 102, by, e.g., submission of a verified password. Accordingly, the locator or pointer may be transmitted to the other client device, from client device 104 or from service provider 105, by SMS text message, an instant message, a voice mail, an email, or any other suitable communication using the address for the other client device 114.

Further still, in yet another alternative embodiment, if the other client device 114 is verified to client device 104 as being an authorized client device, e.g., for a government entity such as Customs or police, using a digital code such as a Quick Response (QR) code or a bar code, the exclusive or restricted locator or pointer to the storage location of data 107 may be transmitted to the other client device 114 via client device 104; alternatively, when client device 104 passes the authorization to service provider 105, the locator or pointer may be transmitted directly to the other client device 114 from service provider 105.

Data file storage manager 204 may refer to a component or module that may be designed, programmed, and/or configured to manage storage of one or more digital files for user 102. In accordance with at least one example embodiment, data file storage manager 204 may direct data 107 to be stored on any of servers 106 hosted by service provider 105. Alternatively, data file storage manager 204 may direct data 107 to be stored on any server hosted by remote storage/retrieval service 112. Regardless of the location of stored data 107, the location may be recorded and managed by data file storage manager 204.

Data file storage manager 204 may be further designed, programmed, and/or configured to provide the location of stored data 107 to subscriber interface 202 for transmission to the address specified by user 102, e.g., as part of the registration of subscription process with service provider 105. The location of stored data 107 may be provided in the form of proprietary code or a URL, referred to above as the exclusive or restricted locator or pointer to the storage location of data 107.

Data file storage manager 204 may be further designed, programmed, and/or configured to disable the locator or pointer to the storage location of data 107 upon fulfillment of at least one predetermined condition. For example, if subscriber interface 202 detects an attempt to access data 107 using a locator or pointer from a device that does not correspond to the address provided during the registration or subscription process, data file storage manager 204 may disable the link or invalidate the locator or pointer. Further, after the location of stored data 107 has been provided to subscriber interface 202, data file storage manager 204 may disable the link or invalidate the locator or pointer after a first successful access to data 107 or after a predetermined amount of time, e.g., hours, days, or weeks, has elapsed.

Data file storage manager 204 may be further designed, programmed, and/or configured to erase data 107, or to instruct the deletion of data 107, from a storage location upon disabling the link or invalidating the locator or pointer. Accordingly, data file storage manager 204 may be even further designed, programmed, and/or configured to direct data 107 to be stored at a new storage location on any of servers 106 hosted by service provider 105 or at a new storage location on any server hosted by remote storage/retrieval service 112. Data file storage manager 204 may, thusly, be designed, programmed, and/or configured to provide the new storage location of stored data 107 to subscriber interface 202 for transmission to the address specified by user 102.

Remote data center interface 206 may refer to a component or module that may be designed, programmed, and/or configured to interface with, at least, remote storage/retrieval service 112. In accordance with the alternative embodiment described above with regard to data file storage manager 204, remote data center interface 206 may manage communications with remote storage/retrieval service 112 by, at least, relaying data 107 and an instruction to store data 107. At least one other embodiment may include subscriber interface 202 transmitting an instruction to client device 104 to transmit data 107 directly to remote storage/retrieval service 112, and remote data center interface 206 transmitting an instruction to remote storage/retrieval service 112 for data 107 to be stored there. Regardless of how remote storage/retrieval service 112 is instructed to store data 107, remote data center interface 206 may be designed, programmed, and/or configured to manage communications between application 200 and remote storage/retrieval service 112, including receiving a location at which data 107 on any corresponding servers.

Thus, FIG. 2 shows an example configuration of an application 200 for implementing secure data access, as implemented on one or more servers of a secure cloud-based storage and retrieval service.

Figure 3:
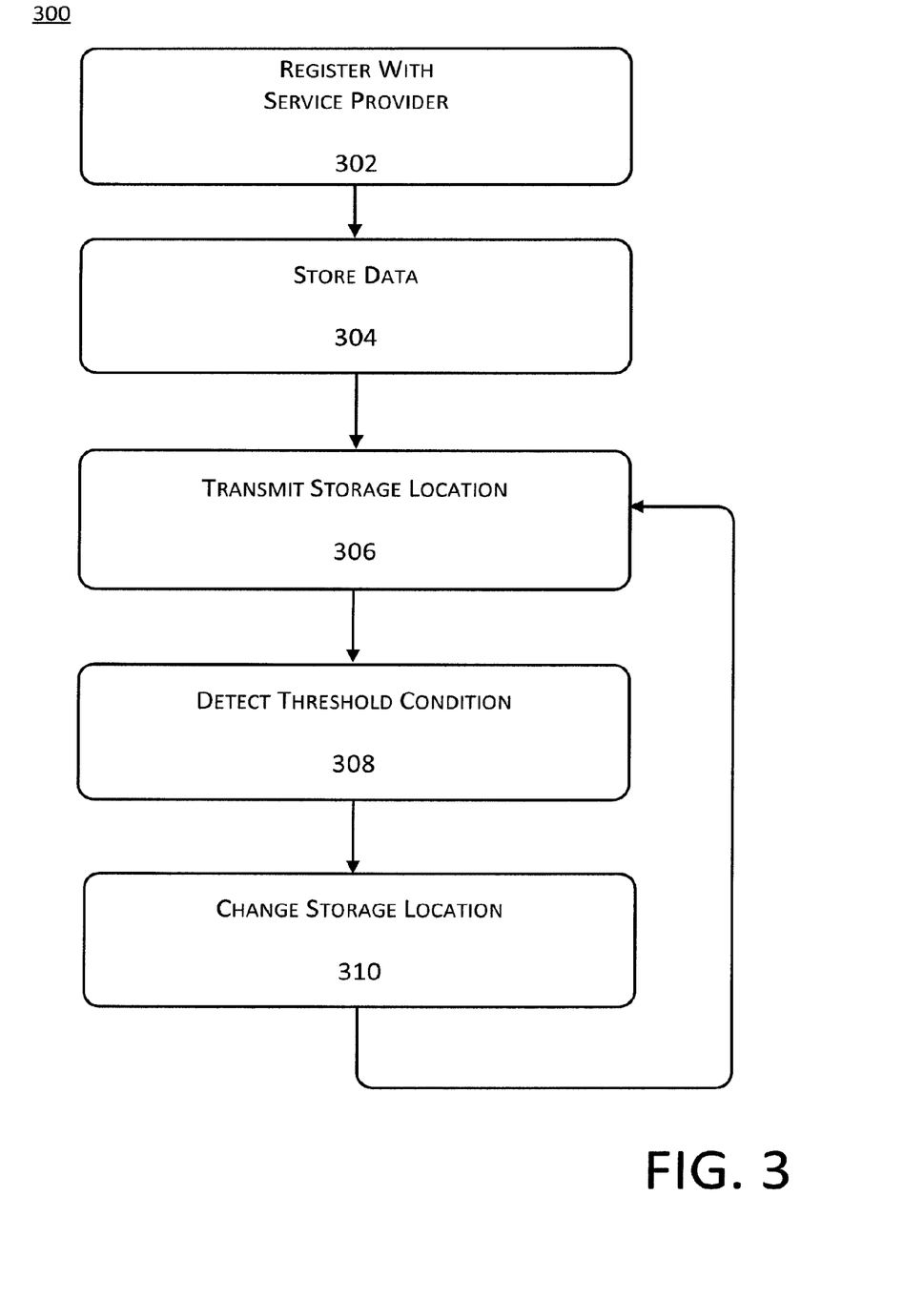
FIG. 3 shows an example processing flow for implementing secure data access, arranged in accordance with at least some embodiments described herein.

FIG. 3 shows an example processing flow 300 for implementing secure data access, arranged in accordance with at least some embodiments described herein. Processing flow 300 may include various operations, functions, or actions as illustrated by one or more of blocks 302, 304, 306, 308, and/or 310. More particularly, processing flow 300 shows sub-processes that may be executed by various components of application 200 hosted on or otherwise associated with cloud-based service provider 105. Although illustrated as discrete blocks, various blocks may be divided into additional blocks, combined into fewer blocks, or eliminated, depending on the desired implementation. Processing may begin at block 302.

Block 302 (Register With Service Provider) may refer to subscriber interface 202 interfacing with, at least, client device 104, so that user 102, exercising ownership and/or control of client device, may subscribe to the secure cloud-based storage and retrieval services offered by the service provider 105. As part of the registration or subscription process with service provider 105, subscriber interface 202 may receive an address specified by user 102, via client device 104, that identifies an exclusive address to which a locator, or pointer, for a location of stored data 107 is transmitted. In accordance with at least one example embodiment, subscriber interface 202 may receive, and therefore associate user 102 with, an address in the form of a telephone number, an email address, an IP address, an IP address, or a MAC address. Thus, the locator, or pointer, may be provided in the form of a proprietary code or a URL, and further may be transmitted from application 200 for access by user 102 in the form of, e.g., an SMS text message, an instant message, a voice mail, or an email. Processing flow 300 may proceed from block 302 to block 304.

Block 304 (Store Data) may refer to data file storage manager 204 directing data 107, received from client device 104 under the ownership and/or control of user 102, to be stored in any of servers 106 hosted by service provider 105. Alternatively, data file storage manager 204 may direct data 107 to be stored on any server hosted by remote storage/retrieval service 112. Regardless of the location of stored data 107, the location may be recorded and managed by data file storage manager 204.

Block 304 may further refer to data file storage manager 204 recording a storage location of data 107 at one of servers 106 or at one of the servers hosted by remote storage/retrieval service 112, as received by remote data center interface 206. Processing flow 300 may proceed from block 304 to block 306.

Block 306 (Transmit Storage Location) may refer to subscriber interface 202 transmitting the location of stored data 107, whether stored on one of servers 106 or on any server hosted by remote storage/retrieval service 112, to the address specified by user 102, via client device 104, as part of the registration of subscription process with service provider 105. The transmission of the location of stored data 107, or pointer thereto, may be an exclusive transmission. That is, the device corresponding to the address provided by user 102, e.g., during the registration process, may be the device to which the location may be exclusively transmitted, thus facilitating secure retrieval of stored data 107. The location of stored data 107 may be provided in the form of proprietary code or a URL in the form of, e.g., an SMS text message, an instant message, a voice mail, or an email. Processing flow 300 may proceed from block 306 to block 308.

Block 308 (Detect Threshold Condition) may refer to data file storage manager 204 detecting that a predetermined threshold condition has been met before the location of stored data 107 is changed.

In accordance with at least one example embodiment, the threshold condition may include a passage of a predetermined amount of time since the transmission of the location of stored data 107 by subscriber interface 202 to the address specified by user 102. The predetermined amount of time may be set and measured in terms of seconds, minutes, days, weeks, or even months; and, further, the predetermined amount of time may be dynamically set and/or revised by data file storage manager 204, user 102 via client device 104, or a combination thereof as part of the aforementioned subscription process.

In accordance with at least one other example embodiment, the threshold condition may include a first access of stored data 107 at the location specified in the transmission from subscriber interface 202 to the address specified by user 102. Detection of the access may be implemented by either subscriber interface 202 or data file storage manager 204, singularly or in combination; alternatively, such detection may be communicated by a server hosted by remote storage/retrieval service 112 to remote data center interface 206. Processing flow 300 may proceed from block 308 to block 310.

In accordance with yet another example embodiment, the threshold condition may include subscriber interface 202 detecting an attempt to access data 107 using a locator or pointer from a device that does not correspond to the address provided during the registration or subscription process.

Block 310 (Change Storage Location) may refer to data file storage manager 204 changing the location at which data 107 is stored.

In accordance with at least one example embodiment, when user 102 receives the location in the form of a link to a URL or in the form of proprietary code and further proceeds to access stored data 107, digital file manager 204 may then utilize fulfillment of the threshold condition at block 308 as a catalyst to disable the link or URL and change the storage location of data 107, either on one of servers 106 or a server hosted by remote storage/retrieval service 112, for which a new link or URL may be generated. In accordance with various example embodiments, changing the storage location of data 107 may include erasing or deleting data 107 from a most recent storage location, whether on one of servers 106 or one of the servers hosted by remote storage/retrieval service 112.

Therefore, further to the example, if the address specified by user 102 during the subscription process with service provider 105 is a telephone number for client device, e.g., smartphone, 104, the location of stored data 107 may be transmitted to client device 104 in the form of an SMS text message that includes a link to data 107 stored on one of servers 106. Upon detecting that user 102 has activated, i.e., clicked, the link to receive access to data 107, digital file manager 204 may disable or invalidate the link or URL to the storage location of data 107, erase data 107 from the most recent storage location, and further direct data 107 to be stored at another location on one of servers 106. Alternatively, and further to the example, if the storage location of data 107 is transmitted to client device 104 in the form of proprietary code that includes a link to data 107 stored on one of servers 106, upon detecting that user 102 has activated, i.e., clicked, the link to access data 107, digital file manager 204 may deactivate the link, erase data 107 from the most recent storage location, and then generate a new link to the location of stored data 107 while maintaining the storage location of data 107 on one of servers 106. Processing flow 300 may then return from block 310 to block 306.

According to yet another example embodiment, assuming that address specified by user 102 during the subscription process with service provider 105 results in the location of stored data 107 being transmitted to client device 104 under the ownership and/or control of user 102, client device 104 may transmit the received location of stored data 107 to another client device 114. That is, the message, e.g., link, which includes the location of stored data 107, may be transmitted to another client device 114, at which the link may be activated to access stored data 107, e.g., upon authorization by a password from client device 104. Upon detecting that the link has been activated, digital file manager 204 may disable the link, delete data 107 from the most recent storage location, and then change the storage location and/or link to stored data 107. Processing flow 300 may then return from block 310 to block 306.

In accordance with an example embodiment in which access to the location of stored data 107 is password protected or protected by other means, e.g., biometrics, gestures, etc., upon detecting an unsuccessful attempt to access stored data 107, digital file manager 204 may disable the link, delete data 107 from the most recent storage location, and then change the storage location and/or link to stored data 107. Processing flow 300 may then return from block 310 to block 306.

Another example embodiment may include a scenario in which access to the location of stored data 107 is limited to client device 104 corresponding to the address specified by user 102 during the subscription process with service provider 105. For example, if stored data 107 is an identification document, e.g., driver's license, passport, etc., verification thereof may not be permissible based on a display of data 107 on client device 104. For instance, authorization of a passport at customs may require verification on an authenticated client device. Accordingly, access to the location of stored data 107 may be provided directly to another, i.e., authenticated, client device 114 directly from subscriber interface 202 or from client device 104 after the client device 114 has been authenticated by client device 104. Such authentication may be implemented by client device 104 scanning a QR code, bar code, or other accessible code, which may then be transmitted from client device 104 to subscriber interface 202 for authentication. Thus, verification of data 107 may be executed on a device other than client device 104. Processing flow 300 may then return from block 310 to block 306.

Block 306 (Transmit Storage Location), upon return from block 310, may refer to subscriber interface 202 transmitting the updated location of stored data 107 or updated link to the address specified by user 102.

FIG. 3, therefore, shows an example processing flow for implementing secure data access on one or more servers of a secure cloud-based storage and retrieval service.

Figure 4:
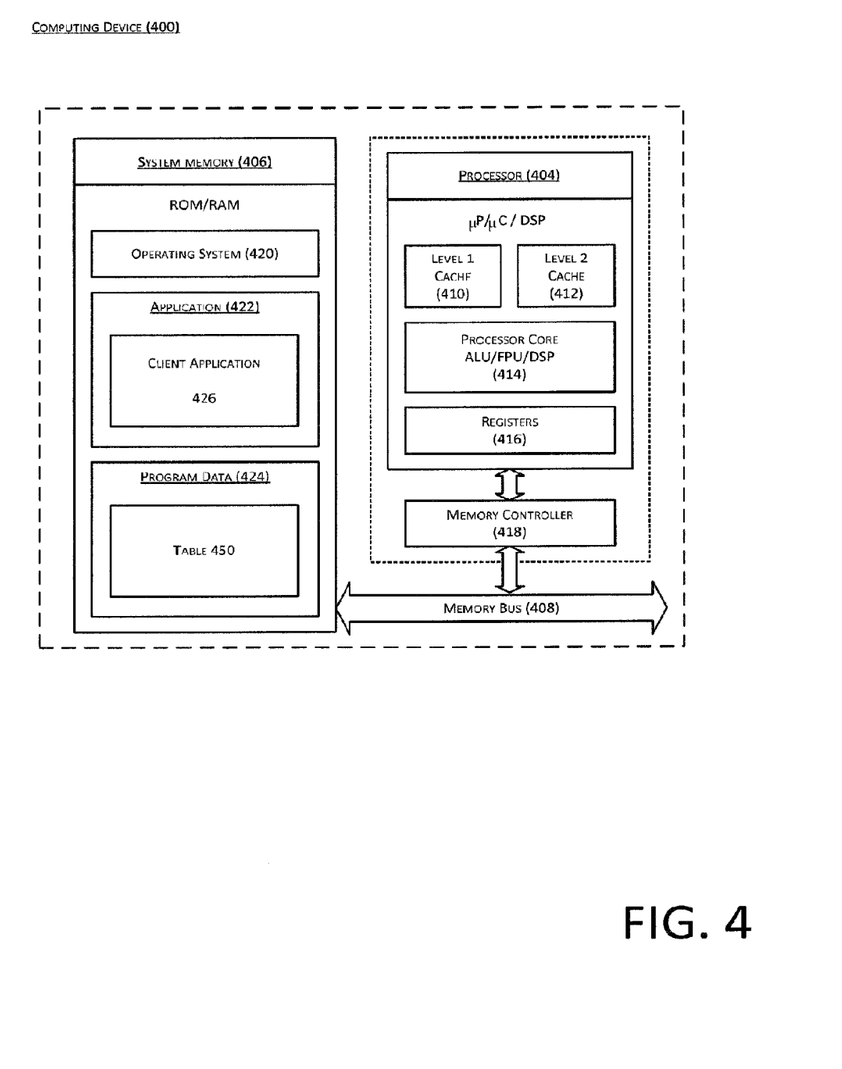
FIG. 4 shows a block diagram illustrating an example computing device by which various example solutions described herein may be implemented, arranged in accordance with at least some embodiments described herein.

FIG. 4 shows a block diagram illustrating an example computing device 400 by which various example solutions described herein may be implemented, arranged in accordance with at least some embodiments described herein.

More particularly, FIG. 4 shows an illustrative computing embodiment, in which any of the processes and sub-processes described herein may be implemented as computer-readable instructions stored on a computer-readable medium. The computer-readable instructions may, for example, be executed by a processor of a mobile unit, a network element, and/or any other computing device, particularly as applicable to the applications and/or programs described above corresponding to the configuration 100 for masking phone numbers.

In a very basic configuration, a computing device 400 may typically include one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one or more levels of caching, such as a level one cache 410 and a level two cache 412, a processor core 414, and registers 416. The processor core 414 may include an arithmetic logic unit (ALU), a floating point unit (FPU), a digital signal processing core (DSP Core), or any combination thereof. A memory controller 418 may also be used with the processor 404; or in some implementations, memory controller 418 may be internal to processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include the aforementioned application 200, e.g., client application 426, that may be arranged to perform the functions for masking phone numbers, which are described previously with respect to FIGS. 1-3. Program data 424 may include a table 450, which may be useful for implementing actuation of appropriate components or modules as described herein. For example, table 450 may include catalog information regarding data stored in a local cloud-based service and data center, information regarding other cloud-based service and data centers associated with a particular cloud-based storage service, etc.

System memory 406 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400, as described above, may be implemented as a portion of a small-form factor portable (or mobile) electronic device such as mobile client 104 or, alternatively, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to include the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A non-transitory computer-readable medium configured to store one or more executable instructions that, when executed, cause one or more processors to:
receive subscription information for a secure data service, the subscription information including an indication of a subscriber and an exclusive specified address that may or may not be associated with the subscriber, wherein the exclusive specified address is for receiving an indication of a location for data stored via the secure data service;
receive a request to store data;
store the data in a first storage location;
transmit, to the exclusive specified address, a first pointer to the stored data in the first storage location, the first pointer including at least one restrictive property restricting use of the first pointer since the first pointer is transmitted based on at least one of an amount of time elapsed since the first pointer is transmitted or a number of attempted accesses to the stored data using the first pointer, the first pointer being one of a proprietary code or a URL and identifying the first storage location; and manage validity of the first pointer based on the at least one restrictive property, wherein use of the first pointer provides access to the stored data.

2. The non-transitory computer-readable readable medium of claim 1, wherein the at least one restrictive property restricts use of the first pointer to a device corresponding to the exclusive specified address.

3. The non-transitory computer-readable medium of claim 1, wherein the at least one restrictive property restricts use of the first pointer to one time use.

4. The non-transitory computer-readable medium of claim 1, wherein the one or more executable instructions, when executed, cause the one or more processors to further:
store the data in a new storage location;
erase the data from the first storage location;
invalidate the first pointer;
generate an updated pointer to the new storage location; and
transmit the updated pointer to the exclusive specified address, the updated pointer having at least one restrictive property to the data restricting use of the updated pointer based on at least one of an amount of time elapsed since the updated pointer is transmitted or a number of attempted accesses to the stored data using the updated pointer,
wherein use of the updated pointer provides access to the stored data.

5. The non-transitory computer-readable medium of claim 4, wherein at least one of the one or more executable instructions, when executed, cause the one or more processors to store the data in the new storage location after a first access of the requested data using the first pointer.

6. The non-transitory computer-readable medium of claim 4, wherein at least one of the one or more executable instructions, when executed, cause the one or more processors to store the data in the new storage location after a predetermined amount of time has passed.

7. The non-transitory computer-readable medium of claim 1, wherein the exclusive specified address is one of a telephone number, an email address, an IP address, or a media access control (MAC) address.

8. The non-transitory computer-readable medium of claim 1, wherein the first pointer to the stored data in the first storage location is transmitted via one of an SMS text message, an instant message, a voice mail, or an email.

9. The non-transitory computer-readable medium of claim 1,
wherein the computer-readable medium is hosted on a server hosted by a data storage/retrieval service, and
wherein further the first pointer identifies a storage location of the stored data on any server hosted by the data storage/retrieval service.

10. The non-transitory computer-readable medium of claim 1,
wherein the computer-readable medium is hosted on a server hosted by a data storage/retrieval service, and
wherein further the first pointer identifies a storage location of the stored data on a server hosted by a remote storage/retrieval service.

11. A method, comprising:
receiving subscription information, the subscription information including an indication of a subscriber and an address that may or may not be associated with the subscriber, wherein the address is for receiving an indication of a location for data stored via a secure data service; receiving a request to securely store a document; storing the document at a first storage location;
transmitting, to the address included in the subscription information, a first locator corresponding to the first storage location, the first locator being one of a proprietary code or a URL; and
managing validity of the first locator based on at least one condition since the first locator is transmitted based on at least one of an amount of time elapsed since the transmitting or a number of attempted accesses to the first storage location using the first locator.

12. The method of claim 11, further comprising:
storing the document at a new storage location;
deleting the document from the first storage location;
disabling the first locator; and
transmitting, to the address included in the subscription information, a new locator corresponding to the new storage location,
wherein use of the new locator provides access to the stored data.

13. The method of claim 11, wherein the at least one condition includes the document being accessed at the first storage location using the first locator.

14. The method of claim 11, wherein the at least one condition includes a predetermined amount of time elapsing after the transmitting of the first locator.

15. The method of claim 11, wherein the at least one condition includes detecting an attempt to access the document from a device that does not correspond to the address.

16. The method of claim 11, wherein the transmitting further includes transmitting the first locator to a secondary address upon receiving authorization.

17. The method of claim 16, wherein the authorization includes a password.

18. The method of claim 16, wherein the authorization includes a digital code.

19. A method, comprising:
  receiving an indication of a subscriber during a subscription process, the indication including an exclusive address that may or may not be associated with the subscriber, wherein the exclusive address is for receiving an indication of a location for data stored via a remote storage service;
  receiving a request to store a document;
  storing the document with the remote storage service;
  receiving location information from the remote storage service, the location information indicating a location at which the document is stored and the location information being included in one of a proprietary code or a URL;
  transmitting the location information at which the document is stored to the exclusive address; and
  invalidating the location information upon fulfillment of a condition since the location information is transmitted based on at least one of an amount of time elapsed since the transmitting or a number of attempted accesses to the location at which the document is stored.

20. The method of claim 19, wherein the condition includes a first access of the document based on the location information.

21. The method of claim 19, wherein the condition includes a predetermined amount of time passing after the transmitting of the location information.

22. The method of claim 19, wherein the predetermined condition includes detecting an attempt to access the document from a device that does not correspond to the exclusive address.

23. The method of claim 19, further comprising:
  storing the document at a new location with the remote storage service;
  receiving new location information from the remote storage device; and
  transmitting the new location information to the exclusive address, wherein use of the new location information provides access to the stored data.

* * * * *

UNITED STATES PATENT AND TRADEMARK OFFICE
CERTIFICATE OF CORRECTION

PATENT NO. : 9,866,560 B2
APPLICATION NO. : 14/007560
DATED : January 9, 2018
INVENTOR(S) : Margalit et al.

Page 1 of 2

It is certified that error appears in the above-identified patent and that said Letters Patent is hereby corrected as shown below:

On the Title Page

On Page 2, in Item (56), under "OTHER PUBLICATIONS", in Column 1, Line 10, delete "-storeage/," and insert -- -storage/, --, therefor.

In the Drawings

In Fig. 2, Sheet 2 of 4, delete "104A" and insert -- 106A --, therefor.

In the Specification

In Column 1, Line 7, delete "PCT Application" and insert -- International Application --, therefor.

In Column 1, Lines 8-9, delete "PCT Application" and insert -- International Application --, therefor.

In Column 8, Line 19, delete "file manager" and insert -- file storage manager --, therefor.

In Column 8, Lines 32-33, delete "client device, e.g., smartphone, 104," and insert -- client device 104, e.g., smartphone, --, therefor.

In Column 8, Lines 37-38, delete "file manager 204" and insert -- file storage manager 204 --, therefor.

In Column 8, Lines 46-47, delete "file manager 204" and insert -- file storage manager 204 --, therefor.

In Column 8, Lines 63-64, delete "file manager 204" and insert -- file storage manager 204 --, therefor.

In Column 9, Line 5, delete "file manager 204" and insert -- file storage manager 204 --, therefor.

Signed and Sealed this
Tenth Day of July, 2018

Andrei Iancu
*Director of the United States Patent and Trademark Office*

CERTIFICATE OF CORRECTION (continued)
U.S. Pat. No. 9,866,560 B2

In Column 10, Line 47, delete "mobile client 104 or," and insert -- client device 104 or, --, therefor.

In Column 11, Line 29, delete "and or" and insert -- and/or --, therefor.

In Column 11, Lines 39-40, delete "hard disk drive, a CD, a DVD," and insert -- hard disk drive (HDD), a compact disk (CD), a digital versatile disk (DVD), --, therefor.

In Column 11, Line 43, delete "communications link," and insert -- communication link, --, therefor.

In Column 12, Line 40, delete "recitation no" and insert -- recitation, no --, therefor.

In Column 12, Lines 61-62, delete "general such" and insert -- general, such --, therefor.

In Column 13, Line 2, delete "general such" and insert -- general, such --, therefor.